US011352237B2

(12) United States Patent
Ragnarsson

(10) Patent No.: US 11,352,237 B2
(45) Date of Patent: Jun. 7, 2022

(54) SELF-POWERED GRAPPLER ASSEMBLY

(71) Applicant: Anders Ragnarsson, Chester, NH (US)

(72) Inventor: Anders Ragnarsson, Chester, NH (US)

( * ) Notice: Subject to any disclaimer, the term of this patent is extended or adjusted under 35 U.S.C. 154(b) by 0 days.

(21) Appl. No.: 16/775,946

(22) Filed: Jan. 29, 2020

(65) Prior Publication Data
US 2021/0229960 A1    Jul. 29, 2021

(51) Int. Cl.
*B66C 1/58* (2006.01)
*B66C 1/42* (2006.01)
*B66C 3/00* (2006.01)
*A01G 23/00* (2006.01)
*B66C 3/16* (2006.01)

(52) U.S. Cl.
CPC ............ *B66C 1/585* (2013.01); *A01G 23/006* (2013.01); *B66C 1/427* (2013.01); *B66C 3/005* (2013.01); *B66C 3/16* (2013.01)

(58) Field of Classification Search
CPC B66C 1/585; B66C 3/005; B66C 3/16; B66C 1/427; A01G 23/006
See application file for complete search history.

(56) References Cited

U.S. PATENT DOCUMENTS

| | | | |
|---|---|---|---|
| 2,707,008 A * | 4/1955 | Bannister | A01G 23/00 144/336 |
| 3,310,335 A | 3/1967 | Shuey | |
| 3,540,770 A | 11/1970 | Mitchell | |
| 3,647,255 A | 3/1972 | Hale et al. | |
| 3,655,232 A | 4/1972 | Martelee | |
| 3,759,564 A | 9/1973 | Seaberg | |
| 3,774,954 A | 11/1973 | Taguchi et al. | |
| 4,129,329 A | 12/1978 | Longo | |
| 4,303,269 A | 12/1981 | Faughnan | |
| 4,381,872 A | 5/1983 | Hahn | |
| 4,526,413 A | 7/1985 | Williams | |
| 5,088,610 A | 2/1992 | Garnier | |
| 5,209,536 A | 5/1993 | Rogers, Sr. et al. | |
| 5,653,350 A | 8/1997 | Maki | |
| 5,979,518 A | 11/1999 | Hamby | |
| 5,992,483 A | 11/1999 | Bohnke | |
| 6,019,406 A | 2/2000 | McDermott et al. | |
| 6,048,012 A * | 4/2000 | Selby | B66C 1/105 294/67.5 |

(Continued)

FOREIGN PATENT DOCUMENTS

GB        859402        1/1961

OTHER PUBLICATIONS

International Search Report Corresponding to PCT/US2021/015433 dated Apr. 12, 2021.

(Continued)

*Primary Examiner* — Lynn E Schwenning
(74) *Attorney, Agent, or Firm* — Finch & Maloney, PLLC; Michael Bujold; Jay Franklin

(57) ABSTRACT

A grappler assembly having an assembly framework and a grappler device that is supported by the assembly framework. The grappler device has at least one pair of grappler arms that engages with a desired section of a tree to be removed. The grappler assembly incorporating its own independent power module for supplying hydraulic power to the grappler device and controlling operation of the at least one pair of grappler arms, and the power module is mounted solely to the assembly framework.

20 Claims, 9 Drawing Sheets

(56) References Cited

U.S. PATENT DOCUMENTS

| | | |
|---|---|---|
| 7,195,296 B2 | 3/2007 | Swift et al. |
| 7,934,757 B2 | 5/2011 | Boutte |
| 2003/0015251 A1 | 1/2003 | Moon et al. |
| 2011/0036043 A1* | 2/2011 | Heinaman ................ B66C 1/105 52/741.1 |
| 2015/0016934 A1 | 1/2015 | Cooper et al. |
| 2015/0289456 A1 | 10/2015 | Cudoc |
| 2017/0233225 A1* | 8/2017 | La Ferla ................ B66C 1/105 294/67.5 |

OTHER PUBLICATIONS

Written Opinion Corresponding to PCT/US2021/015433 dated Apr. 12, 2021.

* cited by examiner

SELF-POWERED GRAPPLER ASSEMBLY

FIELD OF THE INVENTION

The present invention relates to a grappler assembly which is self-powered so that when the self-powered grappler assembly is suspended from a crane, or some other (hydraulically) actuated arm, the grappler assembly can clamp to a desired section of tree, cut, separate and remove that section of tree from a remainder of the trunk and, thereafter, lower and release that removed section of tree onto the ground without requiring any personnel to be located within the tree during operation of the self-powered grappling assembly. The grappler assembly may also include a telescopable power module which adjusts a center of gravity of the grappler assembly to improve engagement of the self-powered grappler assembly with the desired section of tree.

BACKGROUND OF THE INVENTION

Grappler devices are well known in the art and are utilized for a variety of different logging applications. These grappler devices may be, for example, fixed to the end of a mechanical arm or boom of a heavy equipment base, motorized forestry equipment, or some other similar heavy duty vehicle, such as a feller buncher, a harvester, a crane, an excavator, a tractor, a truck, etc. However, with respect to all such known prior art grappler devices, the operating power is typically supplied by a power source that is mounted at the base of the equipment a considerable distance away from the grappler device but interconnected therewith via one or more hydraulic lines. That is, typically hydraulic power is delivered to the remote grappler device via hydraulic lines that extend from the hydraulic pump, which is mounted on and driven by the engine or motor of the forestry equipment or heavy equipment, to the remotely located grappler device.

Since the known grappler devices are fixed directly to the end of the mechanical arm or boom, and the operating power of these grappler devices is supplied by a power source mounted on the heavy equipment base or motorized forestry equipment, the reach or range of operation of these grappler devices is limited by the length of the mechanical arm or boom. The limited range of operation of known grappler devices prevents utilizing these grappler devices on relatively tall trees or trees, e.g., greater than 60 feet tall, having limited or no access thereto. Furthermore, due to the rigidity of the connection between the known grappler devices and the mechanical arm or boom, the forces and torques placed on the mechanical arm or boom by the weight of the cut tree or cut section of tree held by the grappler device may cause damage to the mechanical equipment and also limit the work capacity of the heavy equipment base or motorized forestry equipment.

Although cranes and cables can be utilized for cutting down or removing trees and can overcome some of the limitations associated with known grappler devices, the use of a crane and a cable for cutting down a tree normally requires a person to climb the tree and secure the cable to a section of the desired section of the tree before that section can be cut with a chainsaw and then lowered to the ground. A variety of safety concerns and regulations, associated with a worker or person climbing a tree and operating a chainsaw, make this technique of cutting down trees very cumbersome, time consuming and expensive.

In addition, many of the known prior art grappler devices are somewhat difficult for an operator to maneuver due to lack of visibility of the grappler device. Further, the center of gravity of the known prior art grappler devices are generally fixed and this somewhat hinders engagement of the grappler device with a desired section of a tree to be cut.

SUMMARY OF THE INVENTION

Wherefore, it is an object of the present invention to overcome the above mentioned shortcomings and drawbacks associated with the prior art.

A further object of the present invention is to provide the grappler assembly with its own source of hydraulic operating power so that all of the hydraulic requirements, for powering the associated components of the grappler assembly, are supplied directly by a hydraulic power source that is incorporated and integrated into the grappler assembly. In other words, the grappler assembly according to the present disclosure is self powered and can operate without connecting to source of power that is remote from the grappler assembly. In other words power to operate the grappler assembly is not delivered to the grappler assembly from the crane for example by hydraulic lines, electrical cables or the like.

Another object of the present invention is to provide a grappler assembly that utilizes a crane and cable system that enables trees or sections of trees of substantially any size to be cut down without requiring anybody to climb up or be located in the tree during any aspect of the operation of the grappler assembly. Further, as the grappler assembly is suspended, via the cable, by the boom of the crane, the only force applied on the boom by the cut tree or cut section of tree and grappler assembly is the downwardly directed force resulting from the weight of the removed section of tree and the weight of the grappler assembly. That is to say, all of the torques and forces, except for the downwardly directed force, are disconnected from the boom of the crane such that the work capacity of the grappler assembly and crane is not limited by the size of the tree to be cut down. Additionally, substantially any standard crane with a cable and hook can be utilized with the grappler assembly of the present disclosure.

Yet a further object of the present invention is to equip the grappler assembly with a radio control receiver which communicates wirelessly, via radio signals, with a radio control transmitter typically located within an operator cabin at the base of a crane. The operator is thus able to send desired commands, e.g., start the engine, rotate grappler device in a desired direction, rotate grappler assembly relative to the hook, etc., from the transmitter to the receiver in order to control operation of the grappler assembly. The grappler device can be hydraulically actuated, by remote control, so to rotate and steer the grappler assembly when it is utilized with a jib which forcefully controls rotation of the grappler assembly.

A still further object of the present invention is for the grappler device to be pivotably mounted to the grappler assembly framework to permit the orientation of the grappler device to be manipulated during operation and assist with engagement with a section of tree to be removed as well as assist with lowering a cut section of tree onto the ground or other support surface.

Another object of the present invention is to provide a grappler assembly having an alterable center of gravity which assists with both engagement of the grappler assembly with a desired section of a tree to be cut as well as lowering the cut section of the tree onto the ground or other support surface.

Yet another object of the present invention is to provide the grappler assembly with a camera, which communicates wirelessly with a display device, and facilitates viewing of the grappler assembly during operation thereof by an operator to assist with accurate manipulation of the grappler assembly by the operator.

A yet further object of the present invention is to provide a grappler assembly having an emergency release system which enables a backup release of the grappler arms for disengaging the grappler from an engaged section of the tree in the event of a power failure of the control module.

The present invention also relates to a grappler assembly having an assembly framework and a grappler device that is supported by the assembly framework. The grappler device has at least one pair of grappler arms that engages with a desired section of a tree to be removed. The grappler assembly incorporating its own independent power module for supplying hydraulic power to the grappler device and controlling operation of the at least one pair of grappler arms, and the power module is mounted solely to the assembly framework.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description of the disclosure, which should be read in conjunction with the appended drawings. It is to be appreciated that the following detailed description of various embodiments is by way of example only and is not meant to limit, in any way, the scope of the present invention.

Figure 1:
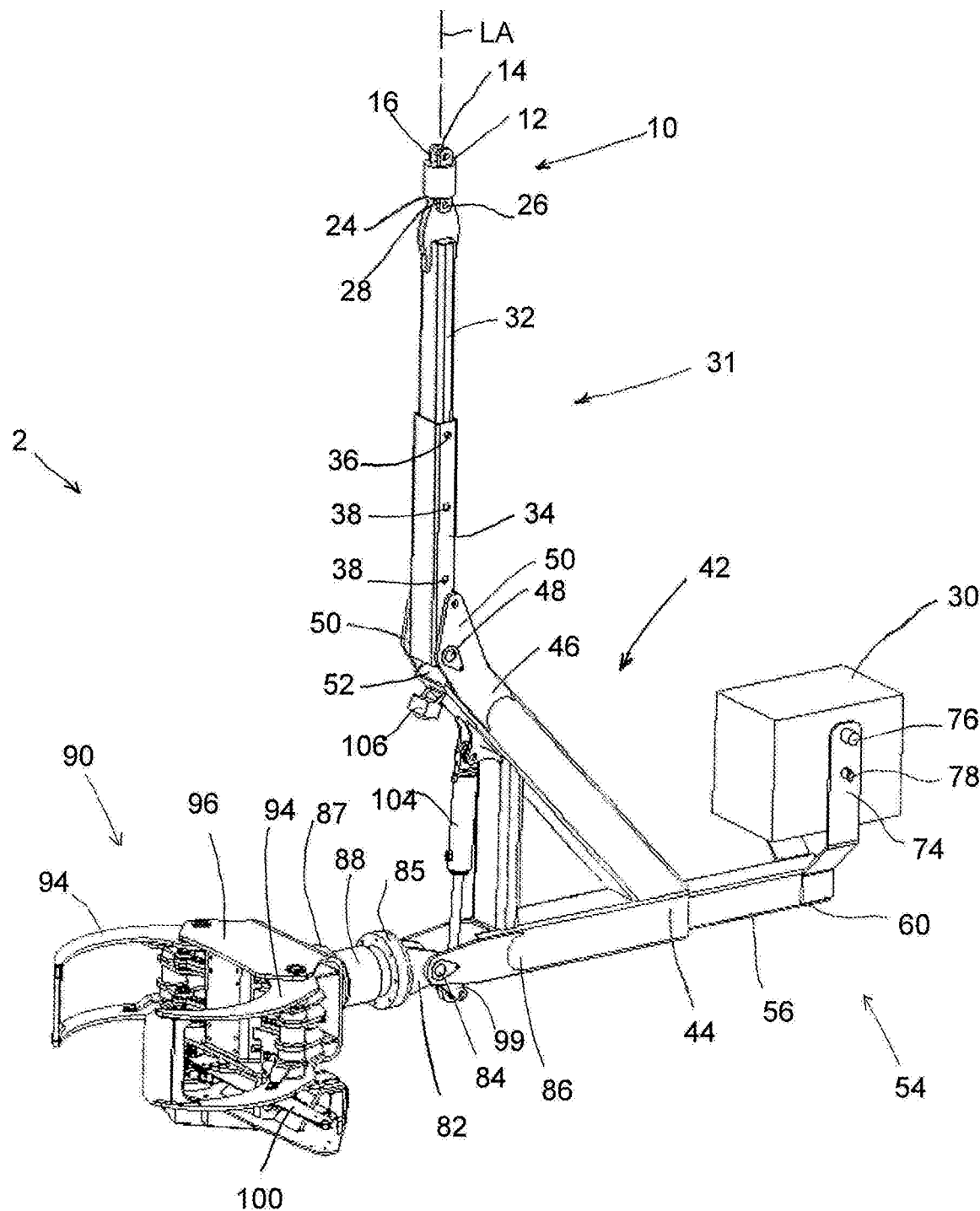
FIG. 1 is a pictorial front right side view showing a grappler assembly according to the disclosure.
Figure 2:
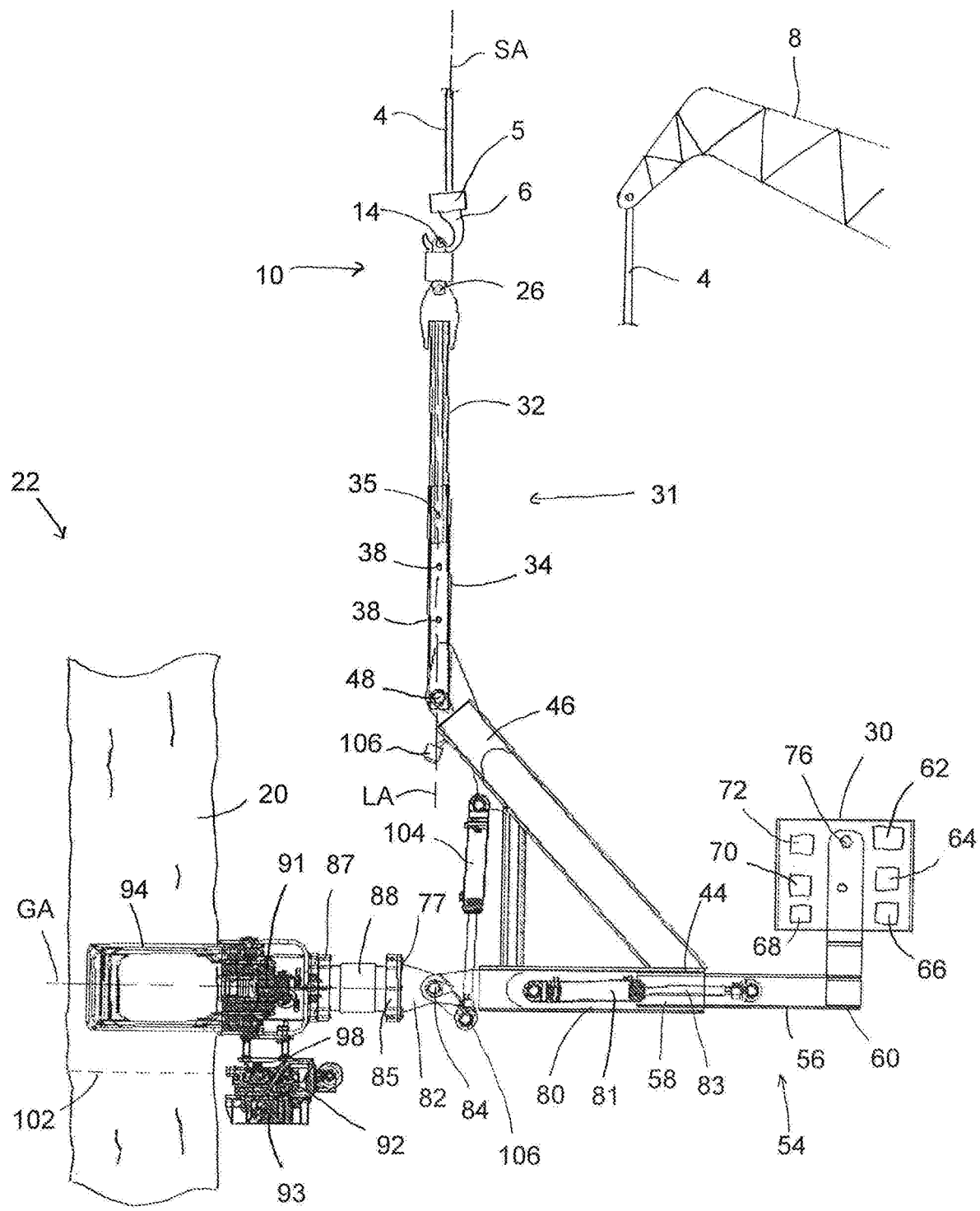
FIG. 2 is a pictorial side elevation view showing the grappler assembly of FIG. 1, supported from a crane by cable and hook with a grappler of the grappler assembly arranged in a horizontal position clamping onto a desired section of a tree.

Turning first to FIGS. 1 and 2, a brief description concerning the various components of the present invention will now be briefly discussed. As can be seen in this embodiment, the present invention relates to grappler assembly 2 which can be suspended, via a conventional cable 4 and a hook 6, from a conventional crane or some other piece of equipment having a hydraulically actuated arm or jib. As there are a number of different types of heavy equipment bases, motorized forestry equipment, and other similar heavy duty vehicles that have a variety of mechanical arms, booms or jibs, the description will refer to such heavy equipment and mechanical arms thereof simply as a crane or jib 8. As is typical in the art, a rotatable swivel 5 is installed between the end of the cable 4 and the hook 6 so as to permit the hook 6 to rotate relative to the cable 4 during operation.

It is to be appreciated that a non-electrically conductive sling can utilized between the grappler assembly 2 and the crane 8 such that if, for some unintended reason, either the grappler assembly 2 or the cut section 20 of tree 22 supported by the grappler assembly 2 inadvertently contacts or touches a power line during operation, the non-electrically conductive sling will prevent any electricity from flowing along the tree 22 or the grappler assembly 2 through the non-electrically conductive sling and along the cable 4 to the crane 8 and thereby avoid possible electrocution of the operator of the grappler assembly 2.

As generally shown, the grappler assembly 2 comprises a hydraulic rotator 10 which facilitates coupling of the grappler assembly 2 to the conventional hook 6 of the crane 8, for example, or some other suspension mechanism and helps to steer the grappler assembly. The hydraulic rotator 10 comprises an upper section 12 which comprises a first pin 14 which extends between a pair of side walls or plates 16 of the upper section 12 of the hydraulic rotator 10 (see FIG. 2). The hook 6 of the crane 8 engages with the first pin 14 in order to suspend the grappler assembly 2 and thus assist with controlling vertical and sideways movement of the grappler assembly 2 relative to the ground as well as a section 20 of a tree 22 to be cut, only a portion of the tree 22 being shown in FIG. 2.

A lower section 24 of the hydraulic rotator 10 has a second pin 26 which extends between the pair of side walls or plates 28 of the lower section 24 of the hydraulic rotator 10. The lower section 24 of the hydraulic rotator 10 is connected to a power module 30 of the grappler assembly 2

(discussed below in further detail) to receive a supply of hydraulic fluid. When a first supply of hydraulic fluid is supplied to the lower section 24 of the hydraulic rotator 10, the lower section 24 of the hydraulic rotator 10 rotates or turns in a first rotational direction relative to the upper section 12 of the hydraulic rotator 10. When a second supply of hydraulic fluid is supplied to the lower section 24 of the hydraulic rotator 10, the lower section 24 of the hydraulic rotator 10 rotates or turns in an opposite second rotational direction relative to the upper section 12 of the hydraulic rotator 10. Such rotation of the lower section 24 of the hydraulic rotator 10 relative to the upper section 12 of the hydraulic rotator 10 permits the operator to suggest or induce rotation of the grappler assembly 2 to achieve a desired position or orientation and thereby assist the grappler assembly 2 engaging with a desired section 20 of tree 22.

The grappler assembly 2 has a telescoping section 31 that includes first and second telescoping members 32, 34. An upper end of the first telescoping member 32 is pivotally connected to the second pin 26 of the lower section 24 of the hydraulic rotator 10 and this second pin 26 generally defines the assembly pivot axis about which the grappler assembly 2 can pivot back and forth, during operation, as will be discussed below in further detail. An upper end of the second telescoping member 34 is received by and engages with a lower end of the first telescoping member 32. The first and the second telescoping members 32, 34 are securely fastened to one another by at least one releasable fastener 36 so as to prevent any undesired movement of the first and second telescope members 32, 34 relative to one another during operation of the grappler assembly 2. As generally shown, the lower end of the first telescoping member 32 can be provided with at least one through bore 35 which extends transversely through the first telescoping member 32. The second telescoping member 34 can be provided a plurality of space apart through bores 38 are arranged along the length thereof which extend transversely therethrough. A mounting bolt 36 passes through the through bores 38 of the second telescoping member 32 and the at least one through bore of the first member 32, to facilitate fixedly attaching those two members with one another in a desired relative arrangement. A nut then engages with the opposite end of the mounting bolt 36 to prevent inadvertent removal of the mounting bolt 36 during use.

It is to be appreciated that the overall axial length of the first and the second telescoping members 32, 34 can readily be varied by the operator, in a conventional manner, depending upon the particular application. For example, if it is desirable for the first and the second telescoping members 32, 34 to have a longer total axial length, so that the grappler assembly 2 has a lower center of gravity and thus can support a longer/relatively heavier section 20 of a tree 22, then the first and the second telescoping members 32, 34 are correspondingly adjusted, relative to one another, so as to increase the overall total length of the telescoping section 31, i.e., the combined total axial length of the first and the second telescoping members 32, 34 is increased. Alternatively, if it is desirable for the first and the second telescoping members 32, 34 to have a shorter total axial length, so that the grappler assembly 2 has a relatively higher center of gravity and thus can support a shorter/lighter cut section 20 of a tree 22, then the first and second telescoping members 32, 34 are correspondingly adjusted, relative to one another, so as to shorten the overall total length of the telescoping section 31, i.e., the combined total axial length of the first and the second telescoping members 32, 34 is decreased.

Figure 7:
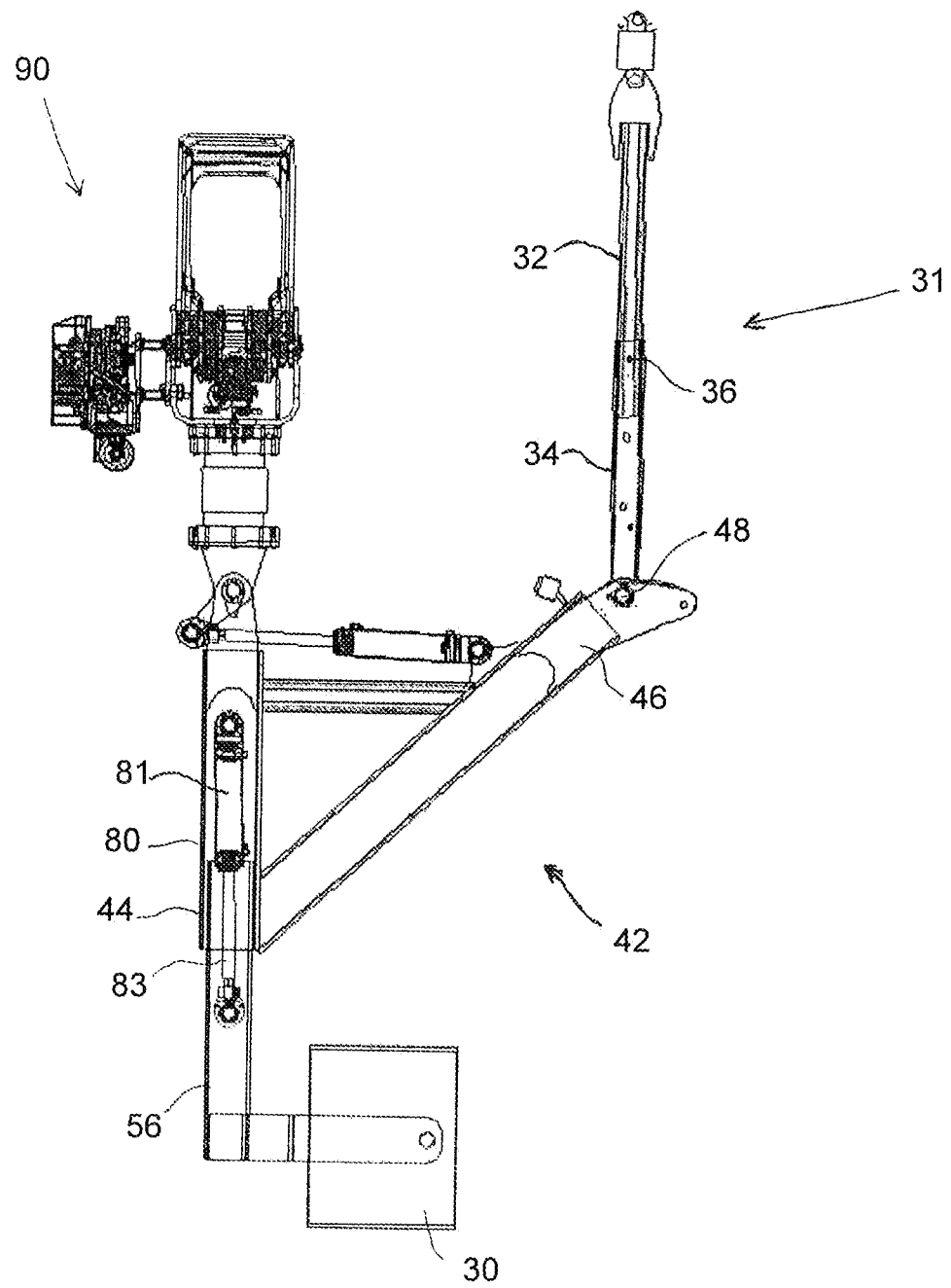
FIG. 7 is a pictorial view of the grappler assembly showing the lower end of the second telescoping member pivotably attached to the V-shaped main body so as to permit pivoting thereof to reduce the overall transportation size of the grappler assembly for transport.

Preferably, the overall axial length of the first and the second telescoping members 32, 34 is adjustable from a minimal axial length of about a few feet or so to a maximum axial length of about 35 feet or so, more preferably the overall axial length of the first and second telescoping members 32, 34 is adjustable from a minimal axial length of about 8 feet or so to a maximum axial length of about 25 feet or so. As noted above, the longer the combined total axial length of the first and the second telescoping members 32, 34, the lower the center of gravity of the grappler assembly 2 is and, correspondingly, the taller/heavier the section 20 of the tree 22 that the grappler assembly 2 will be able to safely remove from the tree 22 being cut. Conversely, the shorter the combined total axial length of the first and the second telescoping members 32, 34, the higher the center of gravity of the grappler assembly 2 and, correspondingly, the shorter/lighter the section 20 of the tree 22 that the grappler assembly 2 will be able to safely remove from the tree 22 being cut. It is to be appreciated that during transportation of the grappler assembly 2 from one site to another site, the first and the second telescoping members 32, 34 are typically adjusted into their shortest total axial length. In addition, the lower end of the second telescoping member 34 may be pivotably attached to a V-shaped main body 42 so as to permit pivoting of the lower end of the second telescoping member 34 relative to the V-shaped main body 42 so as to be generally parallel to a base section 44 of the V-shaped main body 42 (see FIG. 7) and thereby further reduce the overall transportation size of the grappler assembly 2 during transport thereof.

An upper first end 46 of the V-shaped main body 42 is fixedly connected to the lower end of the second telescoping member 34 in a conventional manner by at least one fastener 48, possibly two or more conventional fasteners. The V-shaped main body 42 typically comprises a pair of spaced apart V-shaped metal plates 50 (see FIG. 1) which are interconnected with one another by a variety of cross members 52 so as to form a support structure which is suitable to accomplish the wood harvesting operation described herein in further detail.

A horizontal telescopable power assembly 54 is supported by the base section 44 of the V-shaped main body 42. The telescopable power assembly 54 comprises a telescoping module arm 56 having a first end 58 which is slidably received within and supported by the base section 44 of the V-shaped main body 42 while a second end 60 of the telescoping module arm 56 extends outwardly away from the base section 44 and supports the power module 30 which comprises a power plant 62 such as either a combustion (gas or diesel) engine or an electric motor or combination thereof (e.g., a 10-60 hp motor for example). In addition, the power module 30 also includes a hydraulic pump 64 which is driven by the power plant 62 in order to generate a supply of hydraulic fluid, a hydraulic oil reservoir 66 associated with the hydraulic pump 64, at least one directional valve 68 for controlling the flow of the hydraulic fluid from the hydraulic pump 64 to the various hydraulic components of the grappler assembly 2, a fuel/power supply 70, e.g., a (gas or diesel) fuel tank for powering either the engine, or a battery or batteries for powering the electric motor, and a control unit 72 which receives control signals from the operator for controlling operation of the grappler assembly 2. All of these components of the power module 30 (power module components), for example the power plant 62, the hydraulic pump 64 and oil reservoir 66, the directional valve 68, the fuel/power supply 70, and control unit 72 etc. are only diagrammatically shown in FIG. 2 and are mounted on and supported by a power module support 74. With the power module 30 being supported directly by the V-shaped main body 42, the grappler assembly 2 is to be considered as being "self powered". That is to say in other words that no power is transferred from the crane 8 or along an arm, boom or jig of the crane 8 to the grappler assembly 2. As such no power lines, hydraulic lines, electrical cables or the like need be connected between the grappler assembly 2 and the crane 8 for example.

The power module support 74 is either fixedly mounted to the second end 60 of the module arm 56 or, as diagrammatically shown, is pivotably suspended therefrom by a power module pivot pin 76 for example, so that the power module components can swing or sway, relative to the second end 60 of the module arm 56, and thus always remain in a generally vertical orientation during operation of the grappler assembly 2 regardless of the position and/or tilt angle of the grappler assembly 2. In the event that the power module support 74 and the associated power module components are pivotably suspended from the telescoping module arm 56, rather than fixedly connected thereto, a removable locking feature 78 may also be provided so as to selectively eliminate any swinging or swaying motion of the power module support 74 and the associated power module components relative to the second end 60 of the module arm 56. That is, the power module support 74 (only diagrammatically shown) carrying the power module components can also be provided, in addition to the power module pivot pin 76 which achieves the swinging or swaying motion, with a through bore located vertically above the power module pivot pin 76 while the second end 60 of the module arm 56 may be provided with a mating through bore. When the through bores of the power module support 74 and the second end 60 of the module arm 56 are aligned with one another and the locking feature 78, e.g., a pin, a bolt or some other removable locking feature passes through both of the two aligned through bores, the power module support 74 and the associated power module components become fixedly connected with the second end 60 of the module arm 56 and thereby eliminate any relative swinging or swaying movement therebetween. In the event that the locking feature 78 is subsequently removed, then the power module support 74 and the associated power module components are then able to swing or sway again relative to the second end 60 of the module arm 56.

The first end 58 of the telescoping module arm 56 is typically slidably received within a mating housing 80 which encloses a linear hydraulic cylinder 81. One end of the linear hydraulic cylinder 81 is fixed to the housing 80 while the end of a hydraulic piston 83 is fixed to the module arm 56 so as to achieve the telescoping movement of the telescopable power assembly 54 relative to the V-shaped main body 42 and a remainder of the grappler assembly 2. In view of such arrangement, when hydraulic fluid is supplied to a first side of the linear hydraulic cylinder 81, the telescoping module arm 56 and the power module 30 together are moved away from the V-shaped main body 42 so as to alter the center of gravity of the grappler assembly 2. Alternatively, when hydraulic fluid is supplied to an opposite second side of the linear hydraulic cylinder 81, the telescoping module arm 56 and the power module 30 together are moved toward the V-shaped main body 42 so as to alter again the center of gravity of the grappler assembly 2. The purpose of such movement of the telescopable power assembly 54 relative to the V-shaped main body 42, to alter the center of gravity of the grappler assembly 2, will become apparent from the following description.

It is to be appreciated that the base section 44 of the V-shaped main body 42 may instead be provided with a pair of guides, tracks, etc., or some other guide feature while the first end 58 of the modular arm 56 may be provided with a mating pair of guides, tracks, etc., or other guide feature. The linear hydraulic cylinder 81 has one end connected to the base section 44 of the V-shaped main body 42 and an opposite end connected with the first end 58 of the modular arm 56 to facilitate movement of the modular arm 56, along the mating pair of guides, tracks, etc., relative to the base section 44 of the V-shaped main body 42. Still further, for some other applications, the modular arm 56 may be manually movable relative to the base section 44 of the V-shaped main body 42. It is to be noted that a variety of other mechanisms and techniques may be utilized to achieve the desired movement of the modular arm 56 relative to the base section 44 of the V-shaped main body 42, without departing from the spirit and scope of the present disclosure. Preferably, the modular arm 56 may move relative to the base section 44 of the V-shaped main body 42 by a distance of between 1 and 10 feet or so. In this manner the telescopable power assembly 54 functions as an adjustable counter weight.

However, for some applications, it is to be appreciated that the telescoping feature of the module arm 56 may be completely eliminated so that the first end 58 of the module arm 56 is fixedly connected with the V-shaped main body 42 and the remainder of the grappler assembly 2 while the second end 60 of the module arm 56 supports the power module 30. Such arrangement eliminates adjustment of the center of gravity which is achieved by the telescoping module arm 56.

A grappler mounting body 82 is pivotally connected, via a body pivot pin (hinge) 84, to a lower second end 86 of the V-shaped main body 42 so as to facilitate pivoting movement of the grappler mounting body 82 relative to the V-shaped main body 42 about the body pivot axis defined by the body pivot pin 84. A remote first end 77 of the grappler mounting body 82 is fixed to a first fixed end 85 of a conventional hydraulic grappler rotating device 88 which can be a rotating cylinder, and opposite second end 87 of the hydraulic grappler rotating device 88 is rotatable relative to the first fixed end 85 of the conventional hydraulic grappler rotating device 88. The opposite second end 87 of the hydraulic grappler rotating device 88 supports a conventional grappler 90 as described below in further detail.

Figure 9:
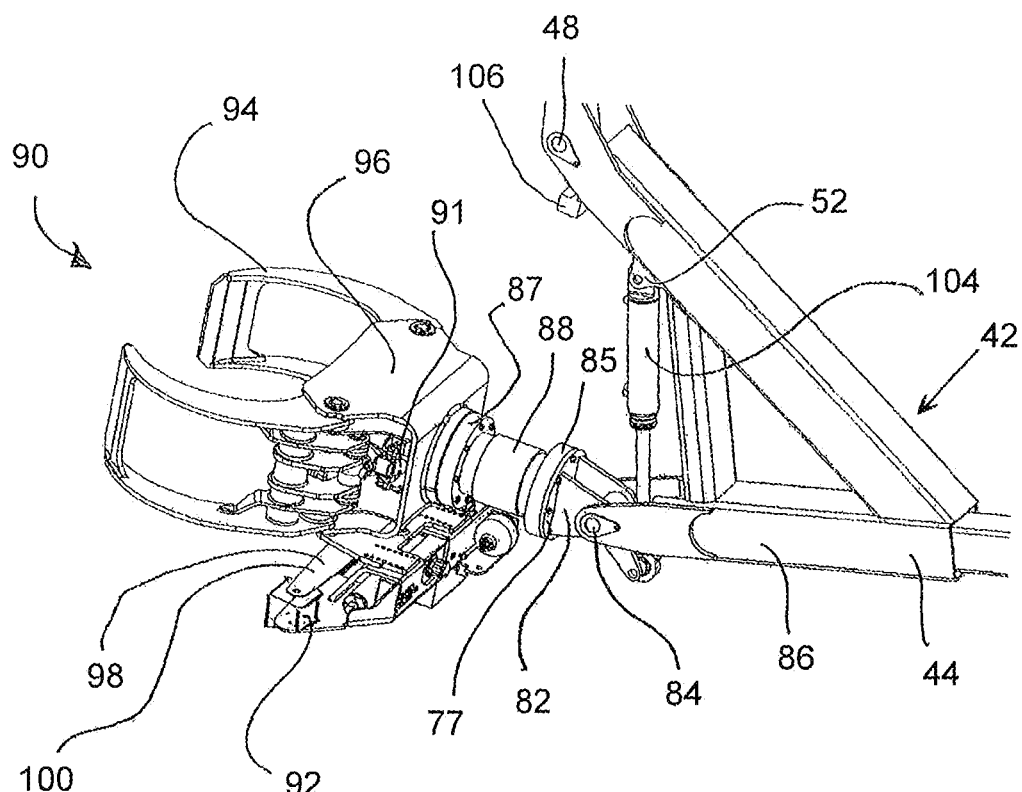
FIG. 9 is a pictorial close up view of the V-shaped main body and the grappler attached thereto by way of a grappler rotating device and a grappler mounting body.

The grappler mounting body 82 is pivotable relative to the V-shaped main body 42 about the body pivot axis 84 by means of a grappler tilt piston/cylinder 104 that interconnects the upper first end 46 of the V-shaped main body 42 with a shorter second end 99 of the grappler mounting body 82 (see FIGS. 1 and 9). The grappler tilt piston/cylinder 104 is a linear hydraulic piston/cylinder and is connected to the hydraulic pump 64 of the power module 30 to facilitate operation thereof. When hydraulic fluid is supplied to one end of the cylinder of the grappler tilt piston/cylinder 104, an overall length of the grappler tilt piston/cylinder 104 is increased so that the grappler mounting body 82 pivots the supported grappler 90 about the body pivot pin 84, relative to the V-shaped main body 42, toward the first and the second telescoping members 32, 34. Alternatively, when hydraulic fluid is supplied to an opposite end of the cylinder of the grappler tilt piston/cylinder 104, the overall length of the grappler tilt piston/cylinder 104 is thereby decreased so that the grappler mounting body 82 pivots about the body pivot pin 84 relative to the V-shaped body 42 and thus pivots the grappler 90 away from the first and the second telescoping members 32, 34.

The grappler tilt piston/cylinder 104 is generally able to tilt, pivot or move the grappler mounting body 82, as well as the supported grappler 90, in a generally vertical direction over a range of motion of about 115°+20° or so. That is, the grappler tilt piston/cylinder 104 is generally able to pivot the grappler mounting body 82 about 30° above a horizontal position and about 85° below a horizontal position. Such tilting movement of the grappler mounting body 82 assists with the grappler assembly 2 properly engaging with a desired section 20 of the tree 22 to be cut as well as lowering that cut section 20 of tree onto the ground or some other surface. It is to be appreciated that the grappler 90 is designed so as to be freely tilted by the grappler mounting body 82 and rotatable by the hydraulic grappler rotating device 88 into any desired position without abutting against the V-shaped body 42.

The hydraulic grappler rotating device 88 facilitates rotation of the grappler 90 in either rotational direction relative to the grappler mounting body 82, about a grappler rotational axis GA (see FIG. 2) that is defined by the hydraulic grappler rotating device 88 and which extends substantially perpendicular to the body pivot pin 84.

When a first supply of hydraulic fluid is supplied from the hydraulic pump 64 of the power module 30 to the hydraulic grappler rotating device 88, the hydraulic grappler rotating device 88 commences rotation of the supported grappler 90 in a first rotational direction. Alternatively, when a second supply of hydraulic fluid is supplied to the hydraulic grappler rotating device 88, the hydraulic grappler rotating device 88 commences rotation of the supported grappler 90 in an opposite second rotational direction. Although the hydraulic grappler rotating device 88 is capable of rotating the grappler 90 up to 360° or more, if a hydraulic rotating cylinder is utilized as the hydraulic grappler rotating device 88, then rotation of the grappler 90, via the hydraulic rotating cylinder, may be limited to less than 360° for example to approximately 180°.

The hydraulic grappler rotating device 88 can be equipped with a conventional rotatable hydraulic coupling which facilitates the supply of additional hydraulic fluid through the hydraulic grappler rotating device 88 to the hydraulic components of the grappler 90, e.g., grappler arm cylinders 91, a hydraulic saw motor 92, and a saw hydraulic cylinder 93, regardless of the rotated position of the grappler 90. Use of the rotatable hydraulic coupling with the hydraulic grappler rotating device 88 enables rotation of the grappler 90 up to 360° or more. The purpose of the rotatable hydraulic coupling will become apparent from the following discussion. It should be recognized that if the hydraulic grappler rotating device 88 is formed as a hydraulic rotating cylinder, then the supply of additional hydraulic fluid to the hydraulic components of the grappler 90 can be transmitted via flexible hydraulic lines that are located outside the hydraulic grappler rotating device 88 which limit rotation of the grappler 90 to less than 360°.

As is well known in the art, the grappler 90 normally equipped with two pairs of hydraulically movable grappler arms 94 (or possibly only a single pair of hydraulically movable grappler arms), which facilitate grasping and releasing of a desired section 20 of the tree 22 to be cut during operation of the grappler 90, as discussed below in further detail. As is conventional in the prior art, movement of the grappler arms 94 is controlled by one or more grappler arm cylinders 91. When hydraulic fluid is simultaneously supplied via the rotatable hydraulic coupling or via the external flexible hydraulic lines to a first side of the one or more grappler arm cylinders 91, the grappler arms 94 can move in unison with one another to close and grasp a desire section 20 of the tree 22 to be cut. When hydraulic fluid is simultaneously supplied via the rotatable hydraulic coupling or via the external flexible hydraulic lines to a second side of the one or more grappler arm cylinders 91, the grappler arms 94 can move in unison with one another to open and release the desire section 20 of the tree 22 that was cut. The two pairs of hydraulically movable grappler arms 94 cooperate with a clamping surface 96 of the grappler 90 to securely clamp the section 20 of the tree 22 therebetween.

A hydraulically operated valve (not shown in detail) controls operation of the hydraulically movable grappler arms 94 such that, in the event of a power failure of the grappler assembly 2, the load (i.e., a cut section of tree) grasped by the pair of movable grappler arms 94 will be constantly and continuously retained by the grappler arms 94 thus preventing accidental release of the load. It is to be appreciated that the grappler assembly 2 may also be equipped with an emergency release system which enables a back up release of the hydraulically movable grappler arms 94, during a power failure, via a number of predetermined sequential steps, in order to disengage the grappler 90 from an engaged section 20 of the tree 22 to be cut and, thereafter, be lowered to the ground 18 for repair of the grappler assembly 2. The sequential steps provided by the emergency release system can include the opening of one or more hydraulically operated valves that control operation of the gripper arms 94 and/or the directional valve 68.

A bottom portion of the grappler 90 supports a grappler (chain) saw 98 which facilitates cutting of a desired section 20 from a remainder of the tree 22, as will be discussed further detail below. The grappler power (chain) saw 98 has a hydraulic saw motor 92 which is supplied, via the rotatable hydraulic coupling or flexible hydraulic lines, with hydraulic fluid from the hydraulic pump 64 of the power module 30. Alternatively, the grappler power (chain) saw 98 can have an electric saw motor 92 which is driven by electrical power transmitted from the fuel/power supply 70 of the power module 30. The hydraulic or electric saw motor 92 rotates a conventional cutting chain along the exterior perimeter of the saw blade 100 of the grappler power (chain) saw 98 to facilitate cutting through a desired section 20 of the tree adjacent a lowermost portion of the grappler 90. As is also conventional in the art, one end of the grappler power (chain) saw 98 is pivotally supported by a bottom portion of the grappler 90 while a free end of the grappler power (chain) saw 98 is movable, by a saw hydraulic cylinder 93 or saw electric actuator 93 for example, along an arcuate path to facilitate cutting through the desired section 20 of the tree clamped by the grappler arms 94.

When hydraulic fluid is supplied from the hydraulic pump 64 of the power module 30 to the hydraulic saw motor 92 or when electrical power is supplied from the fuel/power supply 70 to the electric saw motor 92, the cutting chain commences rotation along the exterior perimeter of the blade of the grappler power (chain) saw 98. In addition, the hydraulic fluid is also supplied from the hydraulic pump 64, via the rotatable hydraulic coupling or flexible hydraulic lines, to the saw hydraulic cylinder 93 to initiate a relatively slow arcuate pivoting motion of the grappler power (chain) saw 98 along its cutting path. Alternatively electrical power is supplied from the fuel/power 70, via flexible electrical cables, to the saw electric actuator 93 to initiate the arcuate pivoting motion of the grappler power (chain) saw 98 along its cutting path. As the saw hydraulic cylinder 93 or the saw electric actuator 93 gradually pivots the grappler power (chain) saw 98 along its arcuate cutting path, the grappler power (chain) saw 98 gradually cuts through the desired section 20 of the tree 22, for example along dashed line 102 of FIG. 2. Once the section 20 of the tree is completely cut and separated from a remainder of the trunk, the cut section 20 of the tree then becomes entirely supported by the grappler assembly 2 and the crane 8. After this occurs, the hydraulic saw motor 92 or electric saw motor 92 discontinues operation and the saw hydraulic cylinder 93 is then operated, by the hydraulic fluid, in a reverse pivoting direction to return the grappler power (chain) saw 98 back along its arcuate path into its standby position for another cutting cycle.

According to one embodiment, the grappler assembly 2 supports a camera 106 to facilitate remote viewing of the grappler assembly 2 by an operator to assist with precise and accurate engagement of the grappler 90 with the desired section 20 of a tree to be cut. The camera 106 is typically supported by a conventional bracket on the upper first end 46 of the V-shaped main body 42, or possibly on either the first or the second telescoping members 32, 34, and faces in the direction of the grappler 90. A mating display device is located within the crane 8 or other piece of equipment and receives at least a wireless video signal from the camera 106 to facilitate viewing of the grappler assembly 2 by the operator. The camera 106 and the display device communicate wirelessly with one another, as is conventional and well known in the art.

The grappler assembly 2 includes a radio control receiver which can be connected to the control unit 72 of the power module 30 and which communicates wirelessly, via radio signals, with a radio control transmitter typically located within an operator cabin at the base of a crane 8. The operator is able to send desired commands, e.g., start the power plant 62, rotate grappler 90 in a desired direction, rotate grappler assembly 2 relative to the hook 6, etc., from the transmitter to the receiver in order to control operation of the grappler assembly 2.

Generally, the first and the second telescoping members 32, 34, the V-shaped main body 42 and the grappler mounting body 82 form an assembly framework of the grappler assembly 2. In addition, all of the components of the assembly framework are sufficiently thick, robust and durable so as to form a rugged framework which is suitable to accomplish the wood harvesting operation described herein in further detail.

Figure 3:
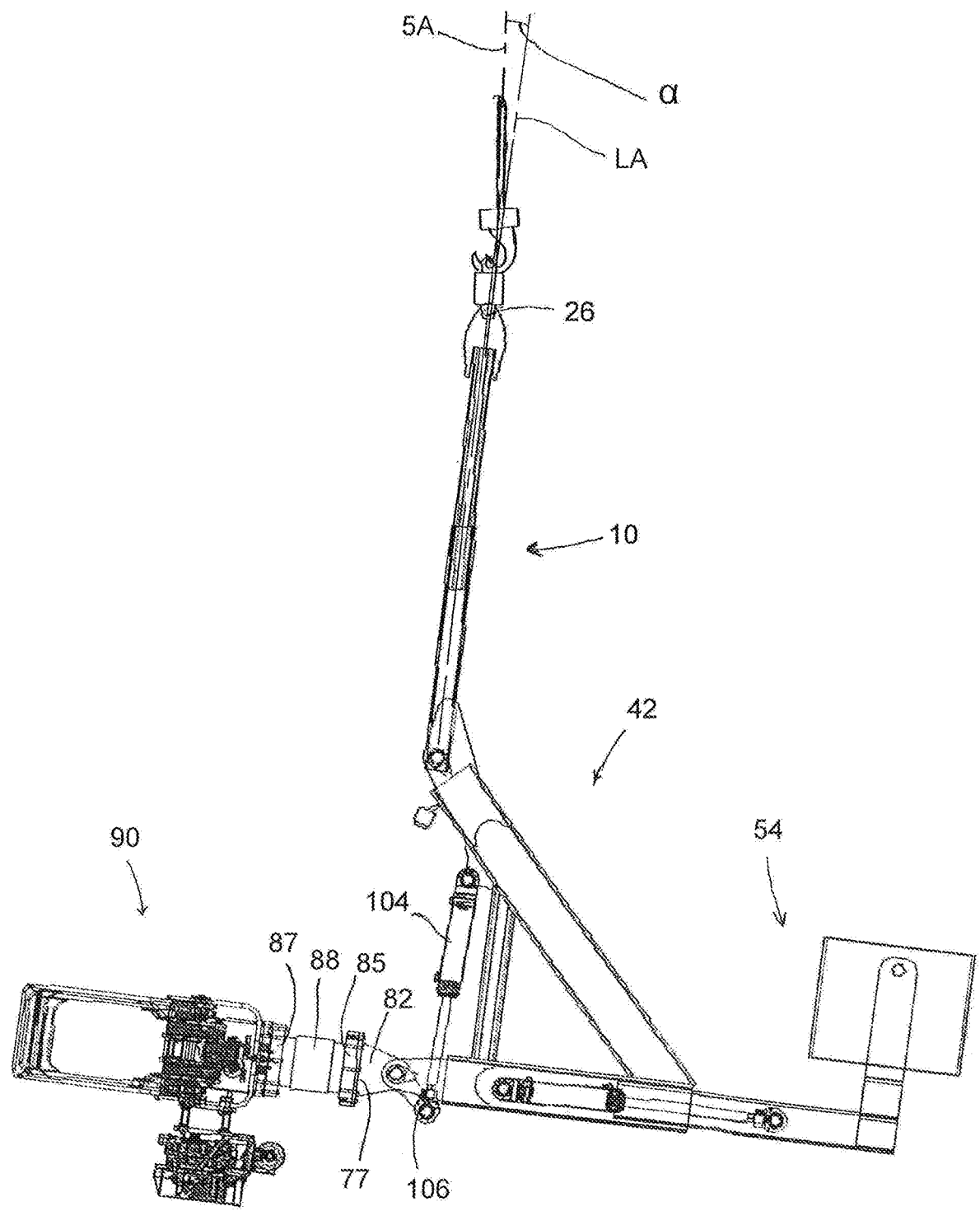
FIG. 3 is a pictorial side elevational view showing the grappler assembly of FIG. 1 in its inclined position, due to the center of gravity of the grappler assembly being moved away from a longitudinal axis defined by the lower portion of the cable.

A lower most portion of the cable 4, which includes the rotatable swivel 5 and the hook 6, defines a longitudinal support axis SA. The first and second telescoping members 32, 34 generally define a longitudinal axis LA of the grappler assembly 2. When the longitudinal axis LA of the grappler assembly 2 is coincident with a longitudinal support axis SA defined by the lower most portion of the cable 4, the grappler assembly 2 is in its so-called "neutral" position, as shown in FIG. 2, and the center of gravity is located relatively close to the longitudinal support axis SA defined by the lower most portion of the cable 4. When the horizontal telescopable power assembly 54 is activated, by the hydraulic fluid, so as to move the telescopable power assembly 54 further away from the V-shaped main body 42, this alters the center of gravity of the grappler assembly 2 and correspondingly moves the center of gravity of the grappler assembly 2 away from the longitudinal support axis SA defined by the lower most portion of the cable 4 in a direction toward the telescopable power assembly 54. As a result of such change of the center of gravity, the grappler assembly 2 moves to an inclined position (see for example FIG. 3), i.e., pivots slightly upward about the assembly pivot axis 26 so that the grappler 90 moves away from the longitudinal support axis SA defined by the lower most portion of the cable 4 and is inclined upward slightly relative thereto by an angle α of 2-15° depending upon how far the horizontal telescopable power assembly 54 is moved away from the V-shaped main body 42. As a result of such change in the center of gravity, the grappler 90 is located generally laterally closer to a tree to be cut then the remainder of the grappler assembly 2 and has an improved "bite angle." Such upward or protruding inclination of the grappler assembly 2 generally minimizes the possibility that other components of the grappler assembly 2 may contact the limbs of the tree to be cut or the tree itself as the grappler 90 is brought into engagement with a desires section of tree to be removed. The improved "bite angle" thus improves engagement of the grappler 90 with a desired section 20 of the tree to be removed.

Alternatively, if the horizontal telescopable power assembly 54 is activated so as to retract or move the telescopable power assembly 54 toward the V-shaped main body 42, this again changes the center of gravity of the grappler assembly 2 and moves the center of gravity of the grappler assembly 2 toward the longitudinal support axis SA defined by the lower most portion of the cable 4 and in a direction toward the grappler 90. As a result of such change of the center of gravity, the grappler assembly 2 pivots about the assembly pivot axis 26 so that the grappler 90 moves toward the longitudinal support axis SA defined by the lower most portion of the cable 4, into a neutral position, as shown in FIG. 2, in which the longitudinal axis LA and the support axis SA are at least substantially aligned.

Figure 8:
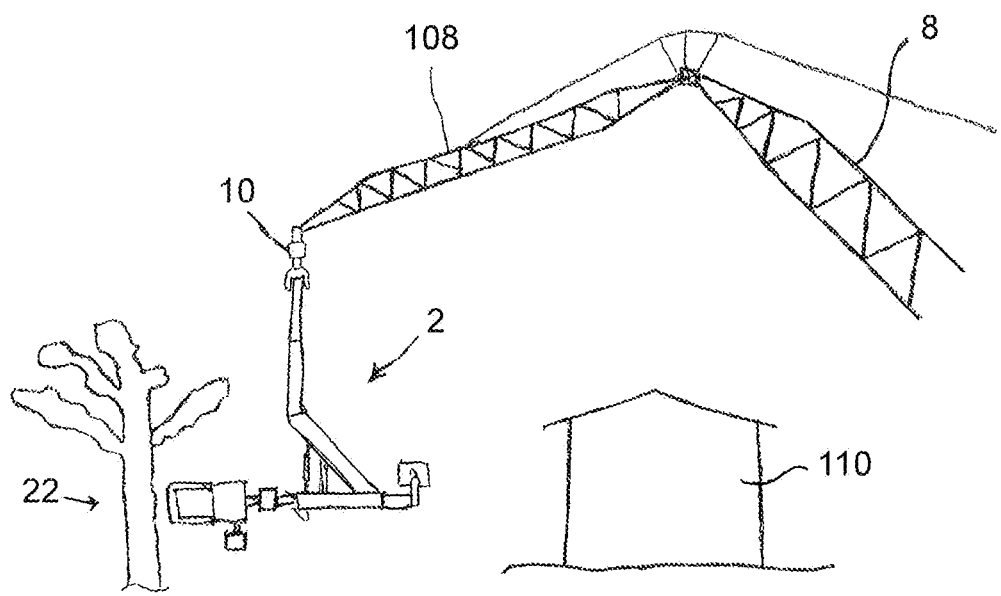
FIG. 8 is a diagrammatic view of jib which is used to suspend the grappler assembly from an upper portion of a crane, for example.

As diagrammatically shown in FIG. 8, a jib 108 may be attached to the upper end of a crane 8, for example, to provide additional reach over a structure 110, power line, etc. The free end of the jib 108 supports the hydraulic rotator 10 and the grappler assembly 2 is directly connected to the bottom portion of the hydraulic rotator 10. With the grappler assembly 2 directly connected to the jib 108, via the hydraulic rotator 10, the jib 108 is readily able to control the precise orientation of the grappler assembly 2 relative to a section of a tree 22 to be engaged and removed. As such jibs 108 are conventional and well known in the art, a further detail discussion concerning the same is not provided.

Operation of the Grappler Assembly

When cutting of a desire section 20 of a tree to be cut is desired, the operator remotely activates the pump 64 to supply hydraulic fluid to the horizontal telescopable power assembly 54 so as to move the telescopable power assembly 54 further away from the V-shaped main body 42 and thereby change the center of gravity of the grappler assembly 2. As a result of such change of the center of gravity, the grappler assembly 2 pivots about the assembly pivot axis 26 so that the grappler 90 moves away from the support axis SA defined by the lower portion of the cable 4 and is thus inclined and protruding by an angle α of 2-15°, for example (see FIG. 3), e.g., and thus has an improved "bite angle." Due to such pivoting movement, the grappler 90 is located generally closer to the tree 22 to be cut then the remainder of the grappler assembly 2. The operator then utilizes the camera 106 to operate the crane 8 and manipulate and guide the grappler 90 into engagement with a desired section 20 of the tree to be removed. It is to be noted that the operator may rotate the lower section 24 of the hydraulic rotator 10, relative to the hook 6, in order to induce alignment of the grappler 90 with desired section 20 of the tree 22 to be removed. The height of the grappler assembly 2, relative to the tree to be cut, can be raised or lowered by the crane 8 to select the desired cutting location of the tree by the grappler assembly 2. If desired, prior to such engagement, the grappler device hydraulic cylinder may be actuated to pivot or move the grappler mounting body 82, as well as the supported grappler 90, so that the grappler arms 94 will generally move along a path which is parallel to the ground and the clamping surface is generally parallel with the tree to be cut.

Once the grappler 90 is located closely adjacent the desired section of the tree to be cut, hydraulic fluid is then supplied from the hydraulic pump 64 to the grappler arm cylinders 91 to actuate the grappler arms 94 simultaneously and close and grasp the desire section of the tree to be cut. The desire section of the tree to be cut is thus clamped between the two pairs of hydraulically movable grappler arms 94 and the clamping surface of the grappler 90 as shown in FIG. 2.

Figure 4:
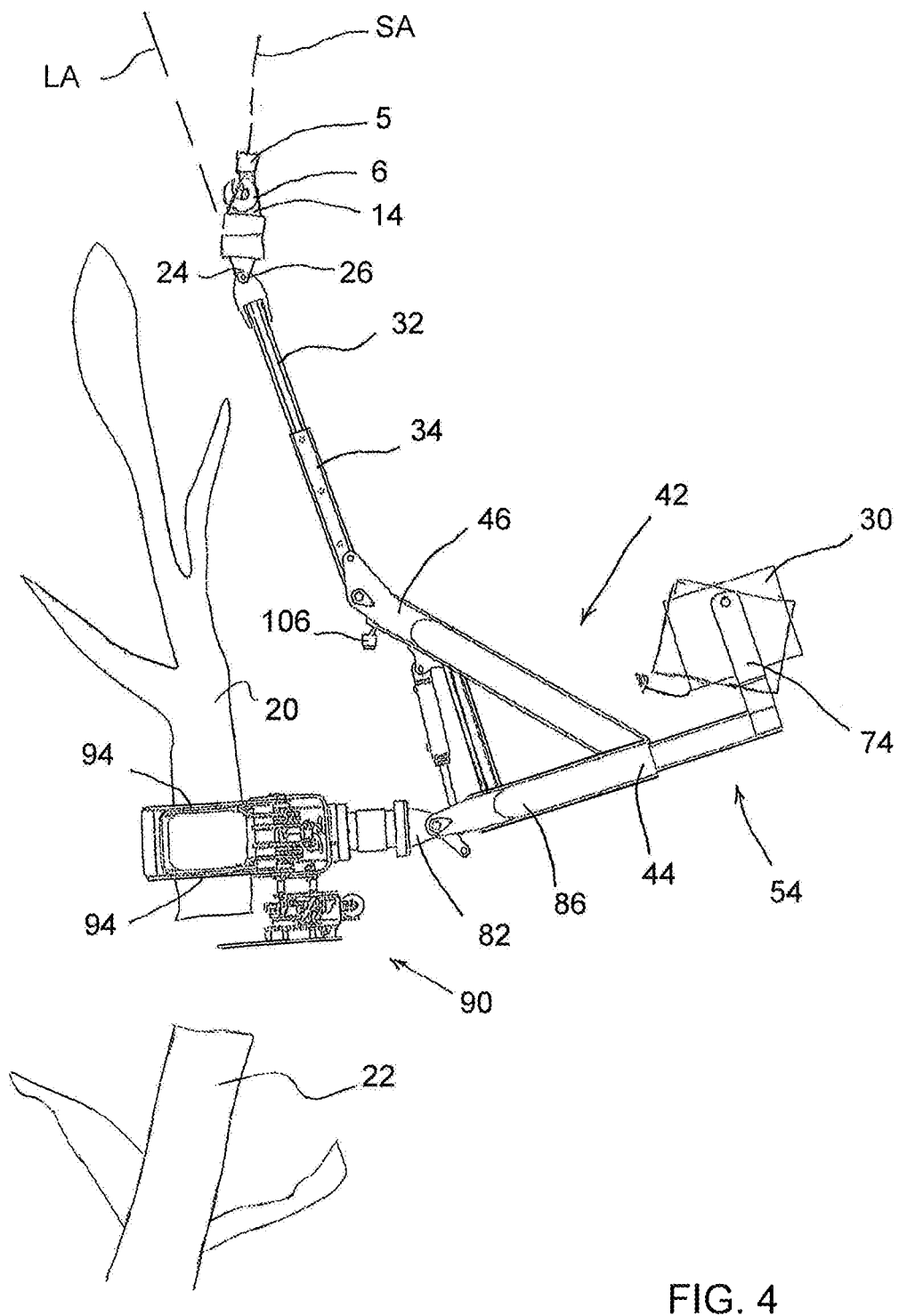
FIG. 4 is a pictorial side elevational view showing the grappler assembly of FIG. 3 in its inclined position and engaged with a section of a tree to be cut.

Next, the operator remotely commences the supply of hydraulic fluid from the hydraulic pump 64 to the saw motor 92 so that the cutting chain commences rotation along the exterior perimeter of the blade of the grappler power (chain) saw 98. In addition, the hydraulic fluid is also supplied from the hydraulic pump 64 to the saw hydraulically cylinder to initiate the arcuate pivoting motion of the grappler power (chain) saw 98 along its cutting path. Thereafter, the saw hydraulically cylinder gradually pivots the grappler power (chain) saw 98, along its arcuate cutting path, to cut through the desired section of the tree. Once the section of the tree is completely cut and separated from a remainder of the tree, the cut section of the tree then becomes entirely supported by the crane 8 and the grappler assembly 2 as shown in FIG. 4. As soon as this occurs, the saw motor 92 discontinues operation and the saw hydraulically cylinder is then operated, by the hydraulic fluid, in a reverse pivoting direction to return the grappler power (chain) saw 98 back along its arcuate path into its standby position for another cutting cycle.

Figure 5:
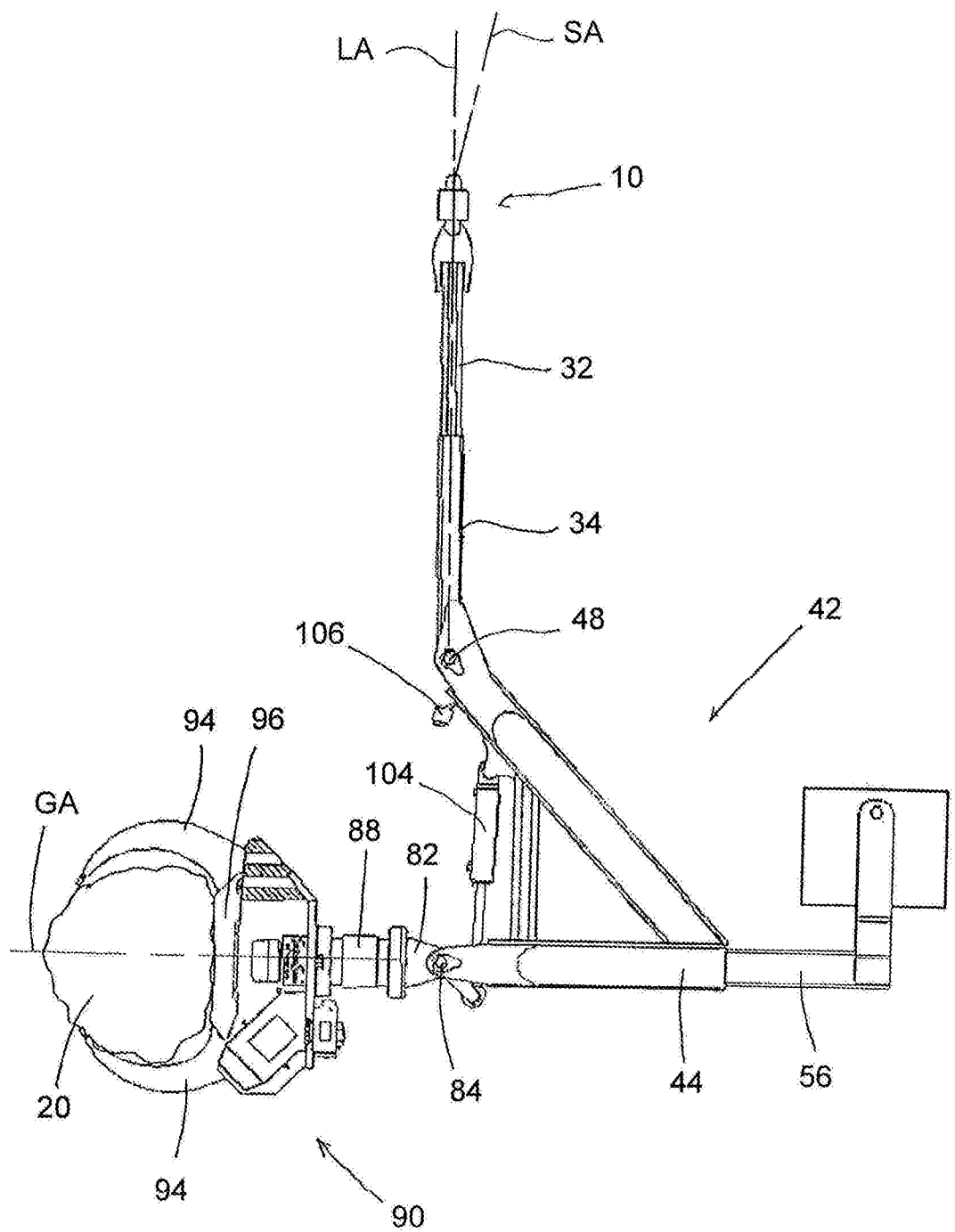
FIG. 5 is a pictorial side elevational view showing the grappler assembly of FIG. 4 clamped to the section of the tree which was just cut, with the grappler rotated 90° to a vertical position such that the section of the tree is suspended above the ground or other support surface.

After the section of the tree becomes entirely supported by the crane 8 and the grappler assembly 2, the operator will then typically operate the crane 8, or other piece of equipment, to move the grappler assembly 2 and the supported section of the cut tree away from a remainder of the tree that was just cut. Due to the added weight of the recently cut suction of the tree which is now supported by the grappler assembly 2, the center of gravity is again altered and thus moved toward the longitudinal axis LA defined by the lower portion of the cable 4, or possibly even on the opposite side of the longitudinal axis LA defined by the lower portion of the cable 4 (see FIGS. 4 and 5). Once the grappler assembly 2 and the supported section of the cut tree are sufficiently clear of a remainder of the tree that was just cut, then the operator can commence lowering the grappler assembly 2 and the supported section of the cut tree toward the ground or other surface.

Figure 6A:
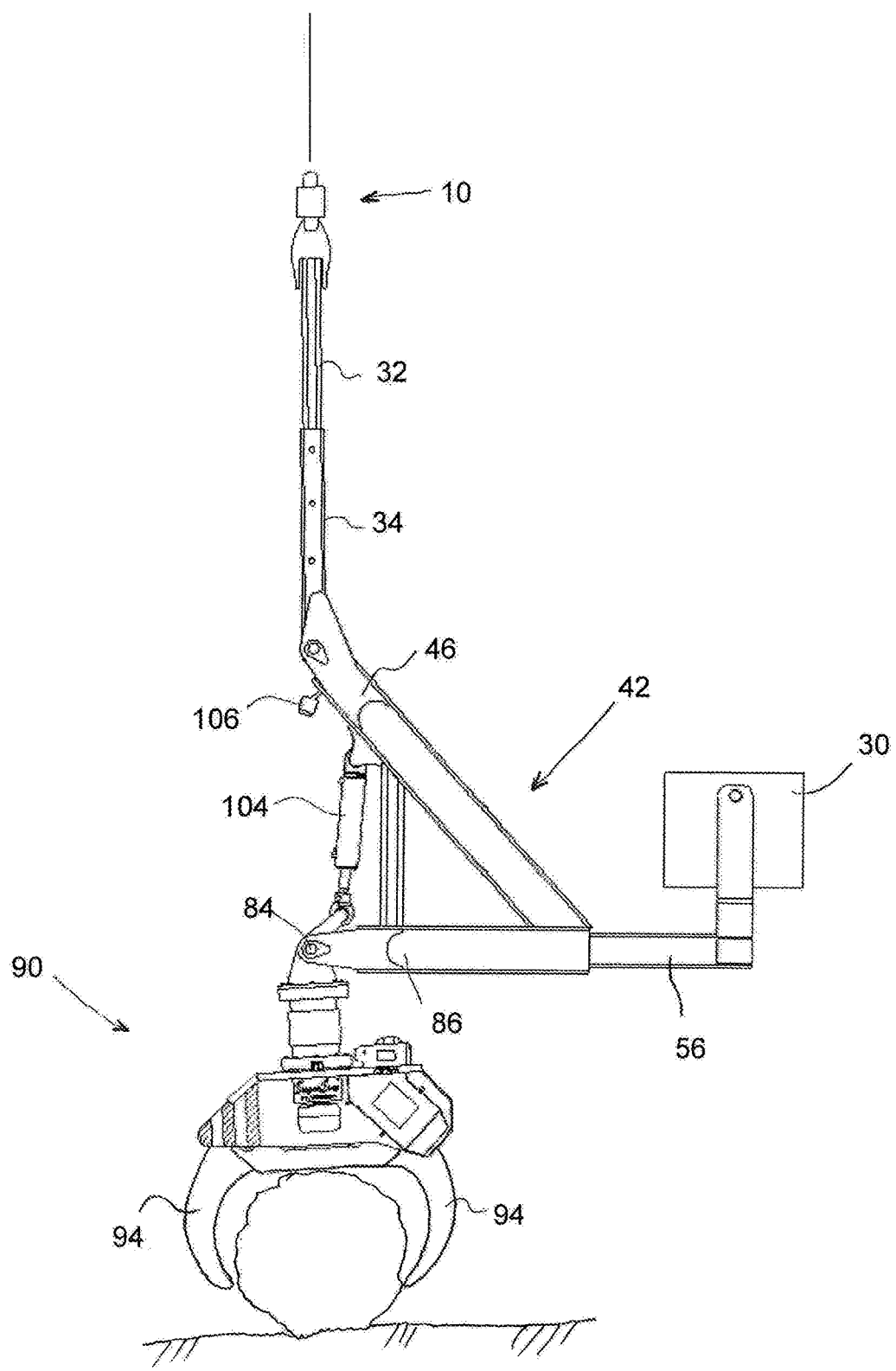
FIG. 6A is a pictorial side elevational view showing the grappler assembly of FIG. 5 lowering the clamped section of the tree onto the ground or other support surface.
Figure 6B:
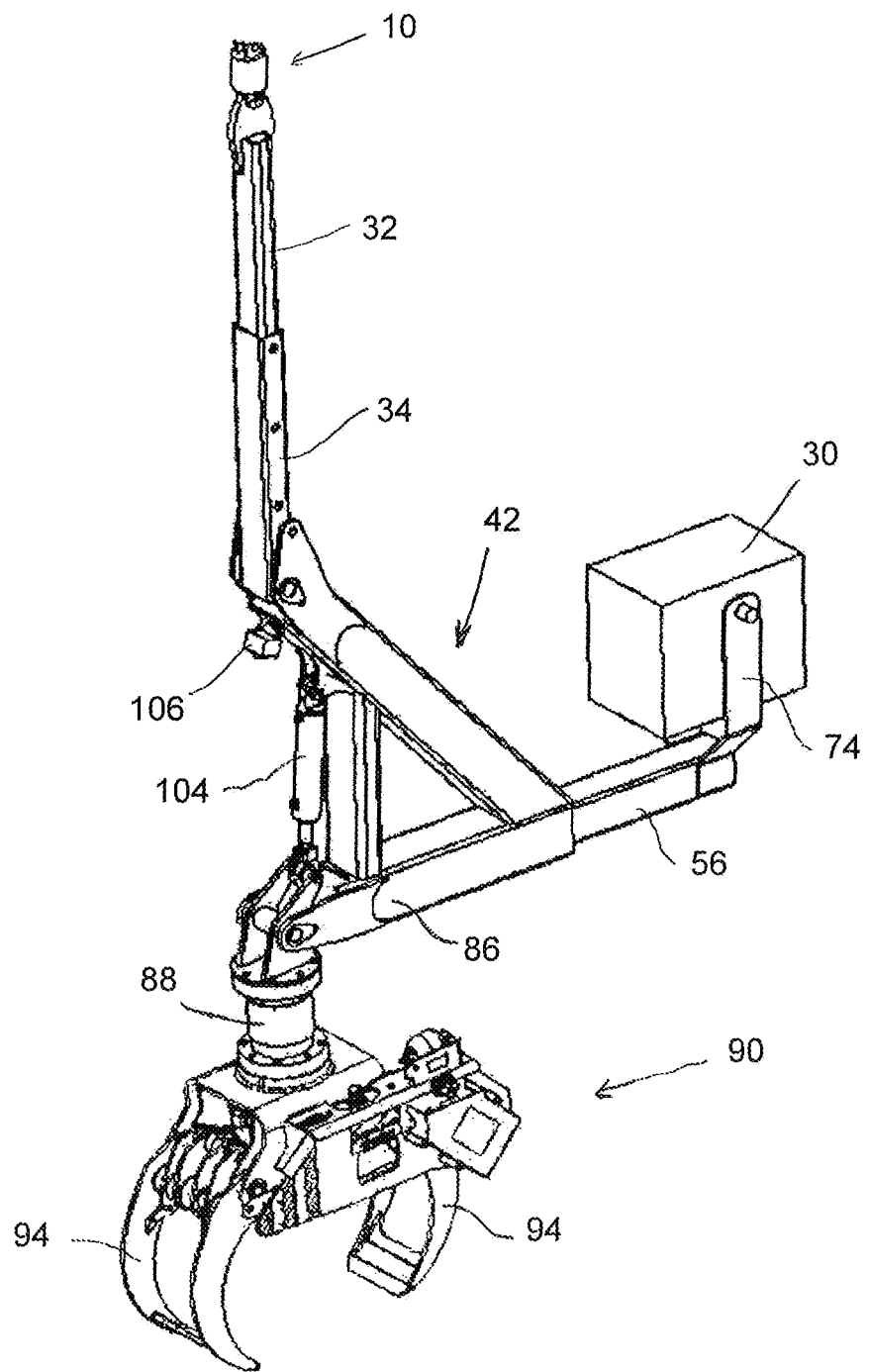
FIG. 6B is a pictorial side elevational view showing the grappler assembly in the neutral position of FIG. 6A.

As the operator operates the crane 8, or other piece of equipment, to lowering the grappler assembly 2 and the supported section of the tree that was just cut toward the ground or other surface, or possibly before such lowering is commenced, the operator actuates the supply of hydraulic fluid to the grappler tilt piston/cylinder 104 to decrease the overall length of the grappler tilt piston/cylinder 104 and thus pivot the grappler mounting body 82, the supported grappler 90 and the section 20 of the tree that was just cut, about the body pivot pin 84, away from the first and second telescoping members 32, 34. Such movement of the grappler mounting body 82 assists with orienting the cut section 20 of the tree generally parallel to the ground so that once the cut section 20 of the tree is sufficiently close to the ground or some other surface, the operator can then actuate the hydraulic pump 64 of the power module 30 to supply hydraulic fluid to the grappler arm cylinders 91 to actuate the grappler arms 94 simultaneously and open and release the cut section 20 of the tree onto the ground or some other surface as shown in FIGS. 6A and 6B. Thereafter, the operator raises the grappler assembly 2 and can then reposition the grappler assembly 2 to cut another desired section of the tree. The above process is repeated numerous times as required or desired by the operator.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

I claim:

1. A grappler assembly comprising:
    an assembly framework comprising first and second members being connected to one another;
    a rotator being supported, adjacent a first end of the first member, to facilitate suspending the grappler assembly from a cable and rotation of the grappler assembly relative to the cable;
    a grappler device being pivotably supported by the second member of the assembly framework, a grappler rotating device for rotating the grappler device relative to the second member; and the grappler device comprising at least one pair of grappler arms for engaging with a desired section of a tree to be removed; and
    the grappler assembly incorporating its own independent power module for supplying hydraulic power to the grappler device and controlling operation of the at least one pair of grappler arms, and the power module being mounted solely to the assembly framework so that the power module solely powers the grappler assembly during operation.

2. The grappler assembly according to claim 1, wherein a first end of a module arm is supported by the second member while a second end of the module arm extends away from both the second member and the grappler device and supports a power module support, and the power module support, the power module and the module arm function as a counter weight for the grappler device.

3. The grappler assembly according to claim 2,
wherein the power module support is pivotably connected to the assembly framework so that the power module support always maintains the power module in a generally vertical orientation during operation of the grappler assembly.

4. The grappler assembly according to claim 1, wherein the power module comprises at least one of a combustion engine or an electric motor, a hydraulic pump which is driven by the at least one of the combustion engine or the electric motor to generate a supply of hydraulic fluid, a hydraulic oil reservoir coupled to the hydraulic pump, and one of a fuel or a power supply for powering the at least one of the combustion engine or the electric motor.

5. The grappler assembly according to claim 1, wherein a power module support is telescopably supported by the assembly framework, by a telescoping module arm, and a first end of the telescoping module arm is supported by the second member of the assembly framework while a second end of the telescoping module arm extends away from the assembly framework and the grappler device and supports the power module support which supports the power module.

6. The grappler assembly according to claim 5, wherein the power module support is pivotably supported by the second end of the telescoping module arm so that the power module support always maintains the power module in a generally vertical orientation during operation of the grappler assembly.

7. The grappler assembly according to claim 1, wherein the second member forms a V-shaped main body which supports a grappler mounting body which supports that grappler device.

8. The grappler assembly according to claim 1, wherein the first and second members each comprise a telescoping member, when the first and the second telescoping members have a relatively longer total axial length, the grappling device has a lower center of gravity and thus can support a relatively heavier removed section of tree, and when the first and the second telescoping members have a relatively shorter total axial length, the grappling device has a higher center of gravity and thus can support a relatively lighter removed section of tree.

9. The grappler assembly according to claim 1, further comprising a hydraulically operated valve that controls operation of the at least one pair of grappler arms, the hydraulically operated valve being controllable to close the at least one pair of grappler arms such that, in an event of a power failure of the grappler assembly, the at least one pair of grappler arms constantly and continuously retain the desired section of tree.

10. The grappler assembly according to claim 9, further comprising an emergency release system which is actuatable, during the power failure of the grappler assembly, to open the hydraulically operated valve and the at least one pair of grappler arms to disengage the desired section of the tree.

11. The grappler assembly according to claim 1, wherein the rotator is a hydraulic rotator which comprises an upper section which engages with the cable in order to suspend the grappler assembly from the cable and a lower section which is connected to the first member of the grappler assembly, and the upper section and the lower section of the rotator are rotatable relative to one another.

12. The grappler assembly according to claim 11, wherein the hydraulic rotator is connected to the power module of the grappler assembly for receiving a supply of hydraulic fluid therefrom and rotating the grappler assembly relative to the cable, during use.

13. The grappler assembly according to claim 11, wherein a grappler power saw is supported adjacent a bottom portion of the grappler device and a free end of the grappler power saw is movable, by an actuator, along a cutting path to facilitate cutting through a desired section of tree located immediately adjacent and below a section of tree which is clamped by the at least one pair of grappler arms, and the first and the second members have a combined axial length of about a 8 feet to about 35 feet.

14. The grappler assembly according to claim 1, wherein the second member and a module arm form a main body of the assembly framework, and the main body spaces and separates the power module from the grappler device so that the power module functions as a counter weight for the grappler device.

15. The grappler assembly according to claim 14, wherein a power module support is one of fixedly or pivotably mounted to a second end of the module arm to either prevent or permit swing or swaying motion of module components relative to the module arm.

16. The grappler assembly according to claim 1, wherein the grappler device is supported by the second member of the assembly framework by a grappler tilt piston/cylinder which facilitates pivoting of the grappler device in a generally vertical direction over a range of motion of about 115°+20°, and the grappler rotating device which is capable of rotating the grappler device by up 360° relative to the second member.

17. The grappler assembly according to claim 1, wherein a first end of a module arm is supported by the second member while a second end of the module arm extends away from the second member and the grappler device and supports the power module, and the module arm and the power module function as a counterweight for the grappler device during use.

18. The grappler assembly according to claim 1, wherein the grappler assembly supports a camera which facilitates remote viewing of operation of the grappler assembly, by an operator, to assist with engagement of the at least one pair of grappler arms with the desired section of a tree to be cut.

19. A grappler assembly comprising:
an assembly framework comprising first and second members being connected to one another;
a grappler device being supported by the second member of the assembly framework, and the grappler device comprising at least one pair of grappler arms for engaging with a desired section of a tree to be removed; and
the grappler assembly incorporating its own independent power module for supplying hydraulic power to the grappler device and controlling operation of the at least one pair of grappler arms, and the power module being mounted solely to the assembly framework so that the power module solely powers the grappler assembly and functions as a counter weight for the grappler device during operation;
wherein the power module has a radio control receiver which is connected to a control unit of the power module and communicates with a radio control transmitter located remotely from the grappler assembly, the radio control receiver receives radio control signals and the control unit actuates at least one of a combustion engine or an electric motor and a hydraulic pump to generate a supply of hydraulic fluid for the grappler assembly.

20. A grappler assembly comprising:

an assembly framework comprising first and second members being connected to one another;

a hydraulic rotator being supported, adjacent a first end of the first member, to facilitate suspending the grappler assembly, via a cable, and rotation of the grappler assembly relative to the cable;

a grappler device being pivotably supported adjacent a second end of the second member of the assembly framework, a grappler rotating device rotatably connecting the grappler device to the second member, the grappler device comprising at least one pair of grappler arms for engaging with a desired section of a tree to be removed, and a grappler power saw being supported adjacent a bottom portion of the grappler device to facilitate cutting through a desired section of a tree, once clamped by the at least one pair of grappler arms; and the grappler assembly incorporating its own independent power module for supplying hydraulic power to the grappler device and controlling operation of the at least one pair of grappler arms, the hydraulic rotator, and the grappler rotating device, and the power module being mounted solely to the assembly framework and extending away from the grappler device so that the power module solely powers the grappler assembly, during operation, and functions as a counter weight for the grappler device during use.

\* \* \* \* \*